Nov. 21, 1939.   E. W. STEVENS   2,180,775
SPINAL ADJUSTER
Filed March 7, 1938   3 Sheets-Sheet 1

Inventor
Evan W. Stevens
By Milo B. Stevens & Co.
Attorneys

Nov. 21, 1939.  E. W. STEVENS  2,180,775
SPINAL ADJUSTER
Filed March 7, 1938  3 Sheets-Sheet 2
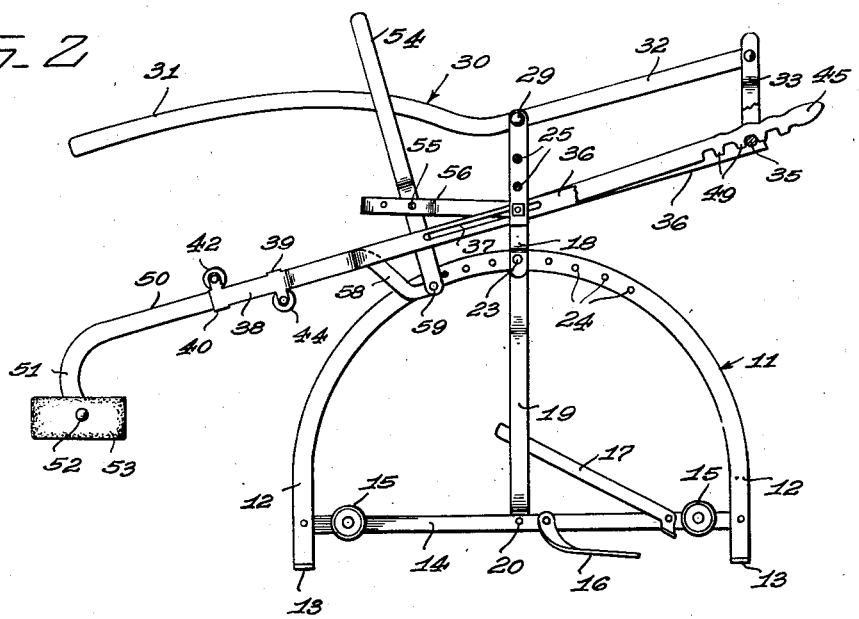
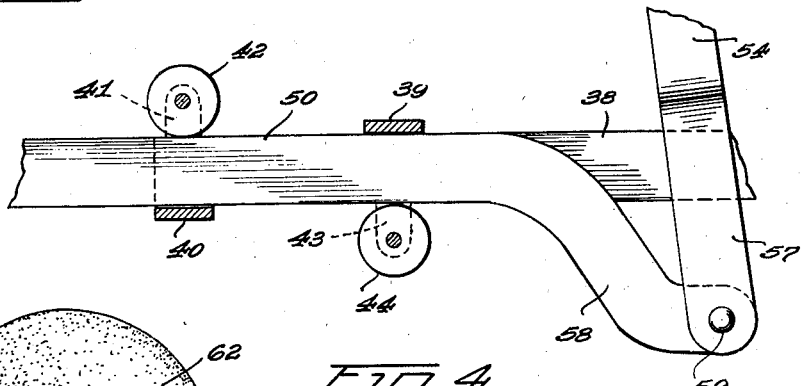
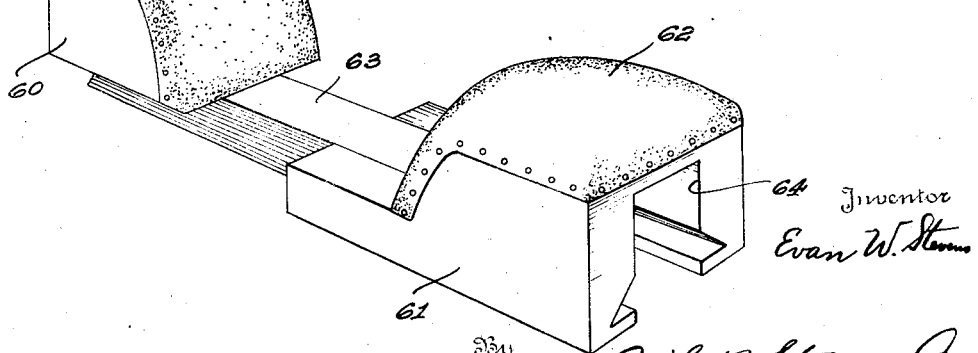
Inventor
Evan W. Stevens Nov. 21, 1939.  E. W. STEVENS  2,180,775
SPINAL ADJUSTER
Filed March 7, 1938   3 Sheets-Sheet 3
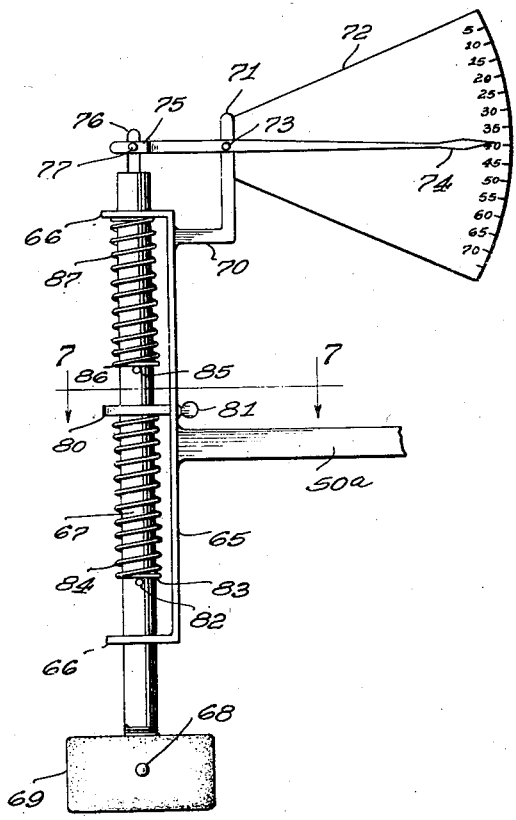
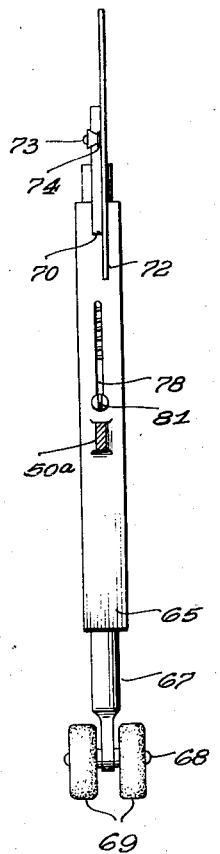
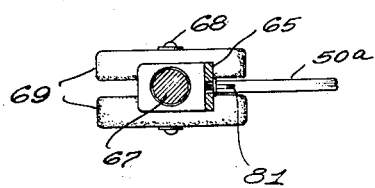
Inventor
Evan W. Stevens
By Milo B. Stevens Co.
his Attorneys Patented Nov. 21, 1939

2,180,775

UNITED STATES PATENT OFFICE 2,180,775

SPINAL ADJUSTER

Evan W. Stevens, Roscoe, Mo.

Application March 7, 1938, Serial No. 194,497

10 Claims. (Cl. 128—72)

This invention relates to the art of manipulative treatment of the human spinal column and areas immediately adjacent thereto.

The efficacy of manual treatment of the spinal vertebrae as a means of alleviating and correcting physical ills has long been recognized by those versed in the science, especially chiropractors, osteopaths, and medicinal practitioners. In correcting spinal maladjustments the knowledge, experience and skill of the individual practitioner is of primary importance where the practitioner must depend upon the sense of touch alone in determining the application and extent of corrective manual treatment.

An object of the present invention is to provide a manually controlled instrument operable to adjust the spine through mechanical means simulating the movements and pressures employed in manual treatment, wherein the entire operation is effected through a leverage system controlled by the operator.

Another object is to provide a spinal adjusting instrument provided with means operable automatically to prevent the occurrence of an opposite maladjustment of vertebrae upon the corrective application to a transverse process of a pressure greater than is required.

Another object is to provide an instrument capable of adjusting the human spinal column to relieve impingements of the spinal cord and nerves through malposition of vertebrae, and to restore intervertebral cartilaginous spaces.

A further object is to provide an instrument for mechanically adjusting the spine to impart a rotative movement to maladjusted vertebrae and which is adjustable to various angles and positions to meet individual requirements.

Other objects will be apparent from the description to those skilled in the art.

While the embodiments herein disclosed constitute the best means I have thus far devised for reducing my invention to practice, I desire it to be understood that the structural details thereof may be varied as desired, and such changes may be made therein as will fall within the scope of the invention as claimed.

In the accompanying drawings:

Figure 2 is substantially a vertical section taken longitudinally through the instrument from just behind the supporting standards shown at the right of Figure 1.

Figure 3 is a fragmentary elevation, partly in section, illustrating the detail of the mechanism.

Figure 4 is a perspective view of a neck holder pad employed in connection with the instrument for securing correct position of a patient.

Figure 5 is a side elevation of a pressure gauge attachment as applied to the instrument.

Figure 6 is a rear elevation thereof.

Figure 7 is a horizontal section taken on line 7—7 of Figure 6.

Figure 1:
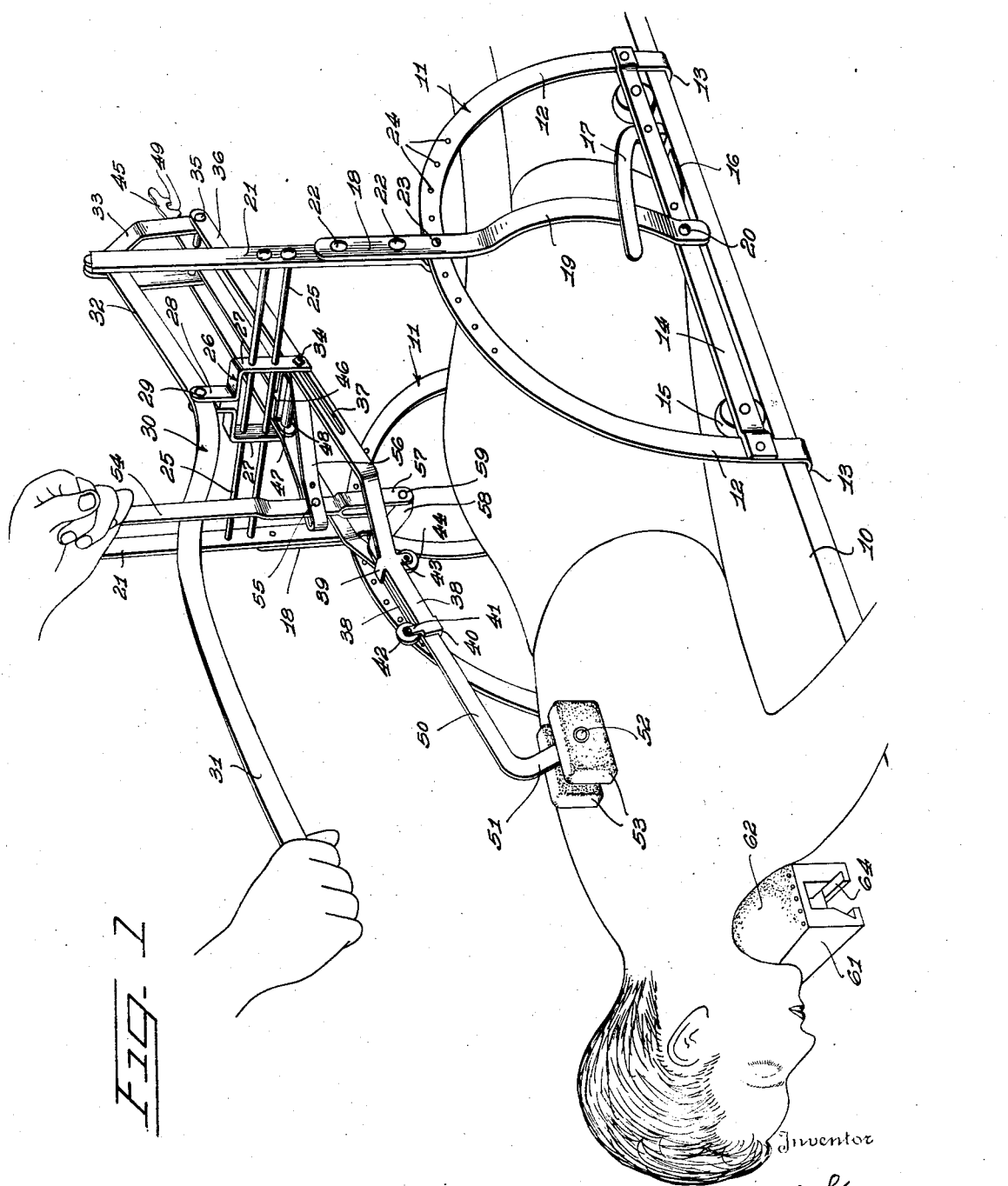
Figure 1 is a perspective view of an instrument constructed in accordance with the invention and as applied in the treatment of a patient.

The instrument is shown as employed in connection with the usual patient-supporting table 10 adapted to sustain a patient in the posture indicated in Figure 1. At each side of the table is disposed a side standard comprising a base 11, here shown as a substantially semi-circular metal bar, arched upwardly and providing leg portions 12 terminating in laterally inturned perpendicular foot flanges 13 which extend beneath the table top. The leg portions 12 adjacent their lower extremities are joined by a diametrical brace bar 14 supporting adjacent each end a roller 15 which engages the upper face of the table top. The brace 14 also mounts a spring finger 16 slidable along the table top and normally tensioned to urge the brace bar upwardly to bind the feet 13 against the under face of the table. Each brace bar 14 further mounts a cam lever 17 which, when its handle is elevated, operates to clamp the support 11 in a locked position on the table top.

Each side standard further comprises an upright 18 capable of angular adjustment with respect to its support 11. In the disclosed embodiment the upright comprises a metal strap bar having an outwardly bowed intermediate portion 19 designed to provide clearance for the hips of a patient on the table and which, at its lower end, has a pivotal connection 20 with the middle point of the brace bar 14. The upper end portion of the upright 18 continues vertically above the support 11. In the embodiment here shown, the upper extension of the upright 18 comprises a vertical post 21 rigidly connected to the member 18 by suitable securing elements, here shown as rivets 22. It is obvious, if desired, the upright 18 and the extension 21 may be made integral.

The angular adjustment of the upright 18 is obtained by means of a detachable securing element, here indicated as a bolt 23, adapted to be passed through registering apertures provided in the uprights and in the base portion of the extension 21 which engages over the opposite side face of the semi-circular support 11, the securing element being disposed through any selected one of a series of adjustment apertures 24 provided in the arch portion of the support bar.

The upper extensions 21 of the two side standards are rigidly connected in transverse alignment by a vertically spaced pair of parallel connecting rods 25 which not only serve to maintain the side standards in properly spaced relation and in alignment, but also to provide a horizontal support upon which is slidably mounted a lever supporting frame 26. This frame 26 consists of a pair of spaced parallel metal straps having vertical portions 27 apertured for loose sliding engagement over and along the rods 25, and having at their upper ends inwardly directed opposed portions which terminate in spaced parallel upright ears 28 mounting a transverse pivot pin 29 which provides the fulcrum for a power applicator lever 30 having a ventral or forwardly extending handle portion 31 of relatively long extent as compared to its rear portion 32 which mounts at its extremity a pivotally suspended yoke 33. Beneath the rods 25 the lower ends of the vertical portions 27 of the frame 26 are connected by a bolt 34 which parallels the rods 25.

The lower ends of the arms of the yoke 33 are connected by a transversely extending bolt 35 which provides a pivotal connection with the rear ends of a forwardly extended pair of spaced parallel arms 36. These arms 36 are provided with transversely registering longitudinally extending closed end slots 37 which play over the bolt 34 so that the two arms 36 are supported upon the bolt 34 and are capable of pivotal as well as longitudinally reciprocating movement thereover.

Beyond the slots 37 the arms 36 extend forwardly for a distance substantially equal to that which they extend rearwardly beyond the slots. At their forward end portions the arms 36 converge and then continue in narrowly spaced parallel forward end portions 38; the upper edges of the portions 38 being connected by a rearward integral bridge portion 39 and their bottom edges being similarly connected by a forward integral bridge portion 40, whereby the forward end portions 38 are secured against relative lateral or longitudinal movement. Above the forward bridge 40 the arm portions 38 are provided with integral upstanding ears 41 between which is journaled a roller 42, and in like manner beneath the rear bridge 39 the arm portions 38 have depending integral ears 43 between which is journaled the lower roller 44, the respective bridges and rollers cooperating to provide a guide for a purpose to be described.

The arms 36 with their forward guide portions 38 comprise a frame that is capable of individual adjustment longitudinally to provide a means for regulating the leverage of the actuating parts of the instrument. Such adjustment is effected by manually moving the arms 36 forwardly or rearwardly as the case may be, the slot 37 and the pivotally suspended yoke 33 permitting such movement. The arms are retained in a desired adjusted position by means of a rack bar 45 which extends rearwardly of the instrument beyond the yoke 33 and which, at its forward or inner end, is provided with a cross head 46 having at each end a forwardly directed arm 47 pivotally mounted on the transverse bolt 34 connecting the bottom of the frame 26. A spacer sleeve 48 is disposed over the bolt 34 to maintain the various elements in their proper operating position. The rack bar 45 may be swung on its pivot to engage or disengage its teeth 49 relative to the bolt 35 connecting the lower ends of the arms of the yoke 33. This adjustment permits of a selective leverage being obtained through the setting of the arms 36.

The forward guide carried by the frame arms 36 supports a manipulator bar 50 provided at its ventral end with a down-turned arm 51 which carries at its lower end a transverse axle member 52 upon which a pair of sponge rubber covered blocks 53 are freely rotatable at opposite side faces of the arms. These blocks 53 are capable of rotation through vertical planes independently of one another but are restrained against movement in any other direction except as they move with the manipulator bar 50. The blocks 53 are spaced apart laterally a distance sufficient to accommodate the ridge of a spinal column and are so positioned as to bear upon the transverse processes. The corners of the blocks are suitably rounded and these blocks correspond, in effect, to the two hands of a person when manipulating a spinal treatment in the absence of the instrument.

Longitudinal reciprocation of the manipulator bar 50 with respect to the instrument is obtained by means of an upstanding actuator lever 54 fulcrumed intermediate its ends, as at 55, in the bight portion of a substantialy V-shaped floating support 56 whereof the arms diverge rearwardly and have a pivotal connection at their ends over the bolt 34 in the bottom of the frame 26. The upper end portion of the actuator lever 54 provides a handle and at its lower end the lever is provided with a fork 57 which straddles the inner downturned end 58 of the manipulator bar 50 and has a pivotal connection 59 therewith.

Figure 4 illustrates the detail of the neck rest shown in its proper position at the left hand of Figure 1. This neck rest comprises a pair of blocks 60 and 61 suitably covered with sponge rubber pads 62 of counterpart formation. The blocks are interconnected in mutually adjusting sliding relation by means of a dove-tailed shank 63 on one block cooperating with the dove-tailed receiving socket 64 in the other block. By means of this connection the two blocks may be moved together or apart to accommodate the rest to individual requirements of the patient.

The guide for the manipulator bar 50 at the forward ends of the arms 36 is of sufficient longitudinal extent to accommodate an appreciable length of the manipulator bar, whereby the movement of the arms 36 under actuation of the lever 31 will be transmitted to the manipulator bar and the blocks 53 will be moved accordingly.

In service, as shown in Figure 1, a patient is positioned on the table 10 with his neck resting on the neck rest comprising the blocks 60 and 61 which, by reason of their configuration will support the neck of the patient in proper position and at the same time will not obstruct the normal process of breathing. The frame 26 is then moved laterally along the horizontal supporting rods 25 to align the manipulating blocks 53 directly over the spinal column of the patient. When the parts are thus properly positioned, assuming the various positions of the elements to be as shown in Figure 1, the instrument is in position for the application of treatment.

It is evident that the actuator lever 54 may be manipulated as desired to effect a longitudinal shifting of the actuator bar 50 in the guide comprised by the portions 38 of the arms 36, so as to bring the manipulating blocks 53 directly over the area to be treated. When the blocks are properly located the requisite pressure is applied by downward movement of the lever 31. As the lever handle 31 is depressed the lever rocks on its fulcrum 29 to elevate the yoke 33 carried by its rear end and thus in turn to elevate the rear ends of the arms 36. These are in turn rocked on the fulcrum provided by the bolts 34 in the frame 26 to depress their forward end guide portions 38 and correspondingly to depress the manipulator bar 50 to bring the manipulating blocks 53 into engagement with the affected area and at the desired pressure.

The application of pressure may be varied as desired by an adjustment of the compound leverage through a desired setting of the frame comprising the arms 36. This adjustment is obtained in the manner previously described by manually shifting this supplemental frame and latching it in desired positions by means of the rack bar 45.

In cases of subluxation the vertebral displacement is such that the transverse process is displaced dorsally at one side while the opposite transverse process is displaced ventrally on the other side of the spinal column. In utilizing the instrument to correct a condition of this character, it will be evident that upon the application of vertical pressure to the displaced transverse process, that particular process will be forced inwardly and will be rotated in a ventral direction while on the opposite side of the spinal column the transverse process will be rotated outwardly and dorsally. In a manipulation of this character by the agency of human hands alone, it is entirely possible, and in fact it is frequently the case, that the pressure is carried beyond the extent desired so that an opposite maladjustment takes place. By the use of this instrument this contingency is entirely eliminated for as the pivotal point of the blocks 53, same being the axle 52, is in the same horizontal plane for each block, it will be evident that in the case of the particular vertebra being rotated it will not be possible for the transverse process on the opposite side from that to which pressure is applied, to be moved outwardly to any greater distance than is permitted by its engagement with the other block. Thus as the corrective pressure is applied it will be impossible to force the subluxation into an opposite maladjustment.

It will be evident from an inspection of the leverage system in Figure 1 that a compounding of movements may be effected as desired by the proper manipulation of the levers 30 and 54. In other words, it is possible to impart a massaging action to the blocks 53 acting ventrally by appropriate movement of the lever 54, at the same time applying vertical pressure through manipulation of the lever 31, thus effecting a restoration of inter-vertebral cartilaginous spaces.

By adjusting the side standards 18 with respect to the semi-circular supports 11, the angle of application of force at the manipulating blocks 53 may be varied as desired.

The instrument is capable of a very wide range of adjustability which enables it to be adjusted to meet any conditions encountered in service.

The instrument as constructed in accordance with this invention makes it possible for any practitioner to apply proper manipulative treatment without fear of over treating or effecting opposite maladjustment. Due to the particular arrangement of the blocks 53 it is impossible for a vertebrae to be forced beyond correct position upon the application of force in a treatment.

This is regarded as an extremely valuable feature of the invention for, as previously stated, it quite frequently occurs that a subluxation will be forced into an opposite maladjustment during a manual manipulation. This is primarily due to the fact that there is no guide, other than the sense of touch, by which the practitioner can determine the true location for the vertebrae that is being moved to its proper position. This reliance on sense of touch alone makes the treatment entirely dependent upon the personal experience and skill of the practitioner. This condition is eliminated by the employment of the instrument of this invention.

Figures 5, 6, and 7 illustrate details of a pressure gauge attachment adapted to be employed when it is desired that the instrument be provided with visual indicating means denoting the degree of pressure applied in the manipulative treatment.

On instruments equipped with the gauge attachment, the manipulator bar 50, illustrated in Figures 1 and 2, is somewhat modified, and it constitutes an arm 50a having a straight shank at its outer end. The ventral or forward extremity of the bar 50a has rigidly secured thereto a channel bar head 65 which is perpendicular to the manipulator bar. The head 65 terminates at each end in a forwardly directed lateral lug 66, the two lugs being extended in parallel relation and being apertured in registry to receive loosely therethrough a thrust transmitting rod 67 whose lower end is provided with a transverse axle member 68 mounting on its ends in loosely pivoted relation a pair of manipulating blocks 69 which are identical in arrangement and function with the blocks 53 as shown in Figures 1 and 2.

The head 65 is preferably arranged in a vertical position and is of proper length so that it terminates beneath the lower limit of swing of the operating lever 31, not shown in Figures 5, 6 and 7. At its upper end the head is provided with a lateral rearwardly extending bracket 70 having an upright arm 71 rigidly mounting a rearwardly extending sector plate 72 provided along its arcuate edge with suitable gauge indicia 73. The upright 71 has mounted thereon, on the pivot 73, a pointer hand 74 which at its rear end cooperates with the gauge 73 and which at its forward end is provided with a fork 75.

At its upper end the thrust transmitting rod 67 is provided with a fixed reduced axial extension 76 provided with a laterally extending pin 77 which plays between the arms of the fork 75 to rock the pointer 74 on its pivot as the rod 67 moves relative to the head 65.

The head 65 is provided with a longitudinal slot through which plays a threaded stem 79 integral with an adjustable lug 80 which is substantially identical with the end lug 66 of the head and which is similarly apertured for loose slidable engagement over the thrust transmitting rod 67, the adjustable lug being vertically shiftable on the head 65 and being clamped in a desired position of adjustment by means of a wing nut 81 threaded on the shank 79 and bearing against the rear face of the head.

Above the lower end lug 66 of the head 65 the thrust transmitting rod 67 carries a diametrically extending stud 82 which projects at its ends from the peripheral face of the rod and supports an abutment washer 83. A coiled expansion spring 84 surrounds the shank of the rod 67 between the abutment washer 83 and the adjustable lug 80, the lug 80 being shiftable on the head to adjust the tension of the spring 84. In like manner, above the lug 80 the thrust transmitting rod is further provided with a stud 85 similar to the stud 82 and which supports an abutment washer 86 which seats the lower end of the coil expansion spring 87 that surrounds the shank of the rod between the washer and the upper end lug 66 of the head.

Except for the construction of the outer end of the manipulator bar 50a carrying the pressure gauge, this bar is identical in construction and in its relation to the other parts of the instrument, and the manipulator bar 50 shown in Figures 1 and 2.

In operation, when using the gauge, when the manipulator bar 50a is depressed the applied pressure is transmitted to the thrust transmitting rod 67 by means of the upper end lug 66 and the intermediate lug 80 acting downwardly upon the respective springs 87 and 84 so that the manipulating blocks 69 are forcibly engaged against the body of the patient. The tension of the springs permit relative movement between the head 65 and the thrust transmitting rod 67 which movement is registered on the gauge 73 to indicate the degree of applied pressure. This indication is obtained through movement of the pointer 74 which rocks on its pivot as the bracket 70 moves up or down with the head 65 and the manipulator bar 50a.

I claim:

1. An instrument for effecting spinal adjustments comprising a support, a lever carried by said support and fulcrumed intermediate its ends to oscillate thereon, manually operable means for compounding the movements of said lever, a manipulator bar supported by one end of said lever and longitudinally slidable relative thereto, means for moving said bar relative to said lever, and spine engageable means carried by said bar.

2. An instrument for effecting spinal adjustments comprising a support, a frame slidable laterally on said support, a power transmission lever fulcrumed intermediate its ends on said frame, a second lever fulcrumed intermediate its ends on said frame, a link pivotally connecting one end of said power transmission lever and one end of said second lever, spine engageable means carried by the free end of said second lever, and means for effecting relative movement between said second lever and said spine engageable means axially of said second lever.

3. An instrument for effecting spinal adjustments comprising a pair of supports, an upright carried by each of said supports, a pair of parallel rods extending transversely between said uprights and connecting the same in rigid relation, a lever supporting frame mounted on said rods, a lever fulcrumed intermediate its ends on said frame, means manually operable to oscillate said lever, a manipulator bar extending beyond one end of said lever, means on said lever supporting said manipulator bar for relative reciprocating movement of said manipulator bar with respect to said lever, a floating support in pivotal connection with said lever supporting frame, an operating lever for said manipulator bar fulcrumed intermediate its ends in said floating support, said operating lever being pivotally connected at one end with one end of said manipulator bar, and spine engageable treating elements carried by the opposite end of said manipulator bar.

4. An instrument for effecting spinal adjustments comprising a pair of supports, an upright carried by each of said supports, a connecting element extending transversely between said uprights and connecting said supports in rigid relation, an intermediate support carried by said transverse connecting element and shiftable longitudinally thereon, a power transmitting lever fulcrumed intermediate its ends on said intermediate support, a power applicator lever fulcrumed on said intermediate support, a link connecting one end of said applicator lever with one end of said power transmitting lever, a manipulator bar slidably mounted on the opposite end of said power transmitting lever, manually operable means for shifting said manipulator bar longitudinally relative to said power transmitting lever, and spine engageable manipulating means carried by said manipulator bar.

5. An instrument for effecting spinal adjustments comprising a pair of supports, uprights carried by each support and adjustable thereon to various angles with respect to the vertical, a connecting member extending transversely between said uprights and connecting the same in rigid relation, an intermediate support member carried by said transverse connecting member and shiftable thereon laterally of said uprights, a power transmitting lever fulcrumed intermediate its ends on said intermediate support member, spine engageable means carried by said lever at one end thereof, a power application lever fulcrumed intermediate its ends on said intermediate support member, a link connecting one end of said power application lever with the other end of said power transmitting lever, said power transmitting lever being longitudinally slotted at its fulcrum point whereby it may be moved longitudinally on its fulcrum relative to said power application lever, and means for latching said power transmitting lever in a selected position of adjustment whereby to vary the leverage thereof.

6. An instrument for effecting spinal adjustment comprising a pair of supports, an upright carried by each support, a pair of vertically spaced parallel rods extending transversely between said uprights and connecting the same in rigid relation, an intermediate support mounted on said transverse connecting rods and shiftable thereon laterally of said uprights, a power transmitting lever fulcrumed intermediate its ends on said intermediate support and longitudinally slotted for sliding movement relative to its fulcrum, a power application lever fulcrumed intermediate its ends on said intermediate support, a link connection between one end of said power application lever and the adjacent end of said power transmission lever, means carried by said intermediate support for latching said power transmission lever in a selected position of longitudinal shift relative to its fulcrum point, a floating support carried by said intermediate support, an actuator lever fulcrumed on said floating support, a guide carried at the opposite end of said power transmission lever, a manipulator bar supported in said guide and slidable therein longitudinally of said power transmission lever, an operating connection between one end of said actuator lever and one end of said manipulator bar, and spine engageable means carried by the free end of said manipulator bar.

7. In a spinal adjustment instrument, a manipulator bar, a manually operable compound leverage system operatively connected with said bar for pressing the same against a spinal column, an axle carried by said bar at its end and extending laterally from opposite sides thereof, and a pressure applying block pivotally mounted on said axle at each side of said applicator bar and rotatable independently of one another in planes parallel to the axis of the bar.

8. An instrument for effecting spinal adjustments comprising a support, a lever carried by said support and fulcrumed intermediate its ends to oscillate thereon, manually operable means for compounding the movements of said lever, a manipulator bar supported by one end of said lever and longitudinally slidable relative thereto, means for moving said bar relative to said lever, spine engageable means carried by said manipulator bar and movable relative thereto, and gauge means between said spine engageable means and manipulator bar for indicating the pressure applied in operating the instrument.

9. In a spinal adjustment effecting instrument, a pressure applicator bar, means for operating said bar, a head fixed to one end of said bar, guide lugs extending laterally from opposite end portions of said head, a thrust transmitting rod slidable loosely through said guide lugs, spine engageable means carried by one end of said rod, a bracket carried by said head, a gauge plate carried by said bracket, an indicator arm pivotally mounted on said bracket for cooperation with said gauge plate, an operating connection between the other end of said thrust transmitting rod and said indicator arm for moving said arm in accordance with relative movement between said thrust transmitting rod and the head, and coiled expansion springs surrounding said thrust transmitting rod between said lug and abutment means fixedly secured to said rods.

10. The structure of claim 9, one of said lugs being adjustable on said head to vary the tension of one of said springs.

EVAN W. STEVENS.